(12) United States Patent
Kushtagi et al.

(10) Patent No.: US 11,625,368 B1
(45) Date of Patent: Apr. 11, 2023

(54) DATA MIGRATION FRAMEWORK

(71) Applicant: PAYPAL, INC., San Jose, CA (US)

(72) Inventors: Harsha Kushtagi, Chennai (IN); Shivani Bangalore, Bangalore (IN); Akshay Bhaskaran, Round Rock, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/509,949

(22) Filed: Oct. 25, 2021

(51) Int. Cl.
*G06F 16/00* (2019.01)
*G06F 16/21* (2019.01)
*G06F 21/53* (2013.01)
*H04L 9/08* (2006.01)
*G06F 16/25* (2019.01)

(52) U.S. Cl.
CPC ............ *G06F 16/214* (2019.01); *G06F 16/25* (2019.01); *G06F 21/53* (2013.01); *H04L 9/0825* (2013.01)

(58) Field of Classification Search
CPC ........ G06F 16/214; G06F 16/25; G06F 21/53; H04L 9/0825
See application file for complete search history.

(56) References Cited

U.S. PATENT DOCUMENTS

| | | | |
|---|---|---|---|
| 2016/0078245 A1* | 3/2016 | Amarendran | G06N 20/00 713/193 |
| 2016/0294549 A1* | 10/2016 | Qian | H04L 9/0822 |
| 2019/0340251 A1* | 11/2019 | Peddada | H04L 9/16 |
| 2020/0119911 A1* | 4/2020 | Shemer | H04L 9/14 |

* cited by examiner

*Primary Examiner* — Diedra McQuitery
(74) *Attorney, Agent, or Firm* — Haynes & Boone, LLP

(57) ABSTRACT

Methods and systems are presented for facilitating a data migration process between two data centers in an automated and secured manner. Based on detection of an event, a migration server initiates a data migration process for migrating data from a source data center to a destination data center. The migration server transmits instructions to a first migration application of the source data center, which causes the first migration application to retrieve the data, encrypt the data within an attested enclave of the source data center, and transfer the encrypted data to a pipeline. The migration server also transmits instructions to a second migration application of the destination data center, which causes the second migration application to retrieve the encrypted data from the pipeline, decrypt the encrypted data in an attested enclave of the destination data center, and store the decrypted data in a data storage of the destination data center.

20 Claims, 7 Drawing Sheets

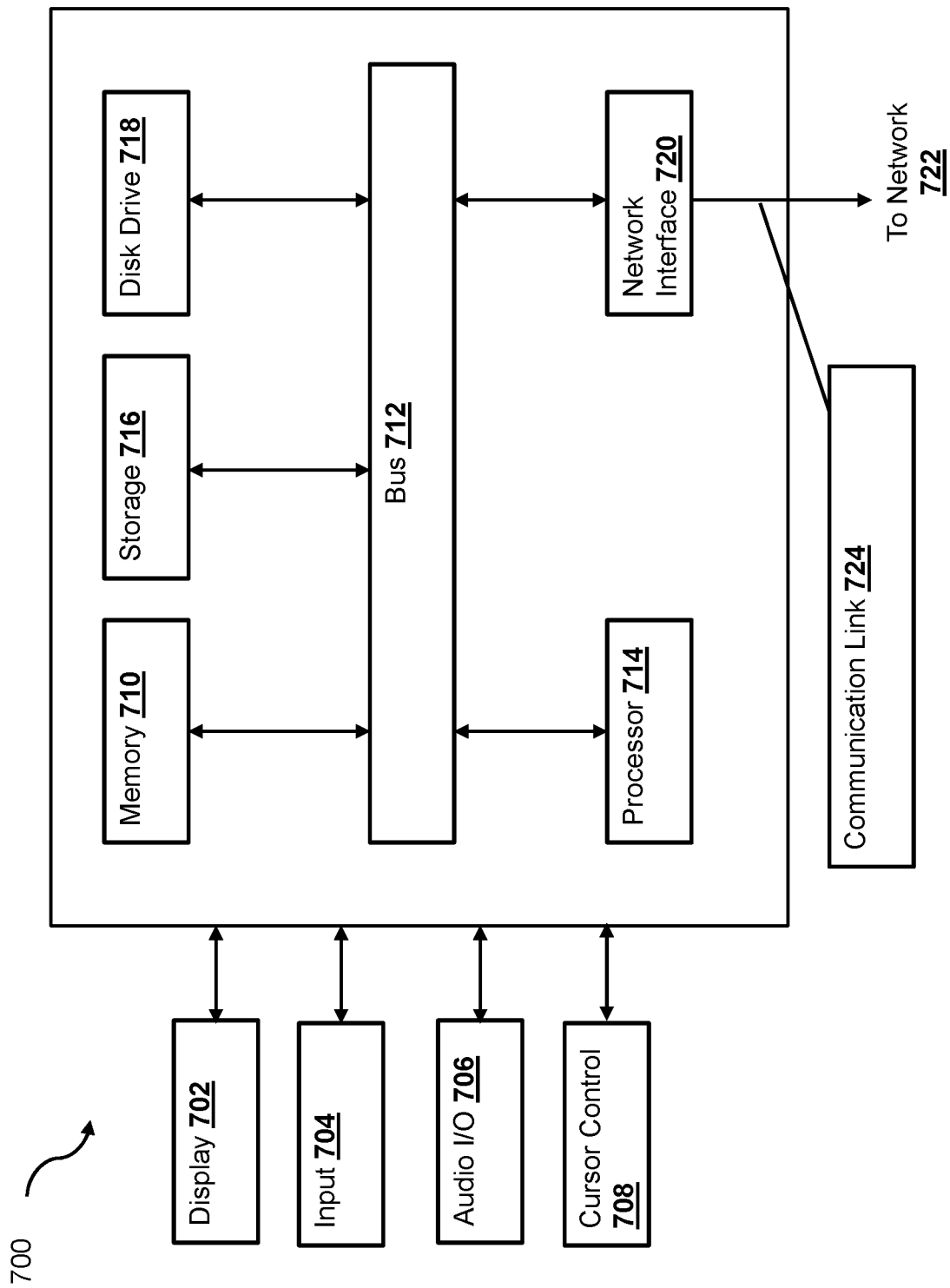

DATA MIGRATION FRAMEWORK

BACKGROUND

The present specification generally relates to electronic data migration frameworks, and more specifically, to providing a framework for performing automated migration of electronic data across different data centers according to various embodiments of the disclosure.

RELATED ART

In today's digital age, electronic data can be a critical asset for any organization. Many recent innovations are directed to the processing, storing, and managing large amounts of data. Storing all of the electronic data associated with an organization at a centralized location (e.g., a data center) enables efficient processing and managing of the electronic data. However, as an organization expands across different geographical territories, the electronic data may be required to be stored at different locations, which necessitates migration of data across different data centers. For example, local laws and regulations of a territory may require that data acquired within the territory remains within the territory. As such, an organization may be required to move certain electronic data that has been previously acquired to a data center located within the territory. In another example, an acquisition of a new business may require an organization to move at least a portion of the data associated with the new business to an existing data center. It is challenging to migrate a large amount of data across different data centers efficiently, securely, and in an automated manner. Thus, there is a need for providing a framework for facilitating automatic migration of data.

BRIEF DESCRIPTION OF THE FIGURES

FIG. 7 is a block diagram of a system for implementing a device according to an embodiment of the present disclosure.

Figure 1:
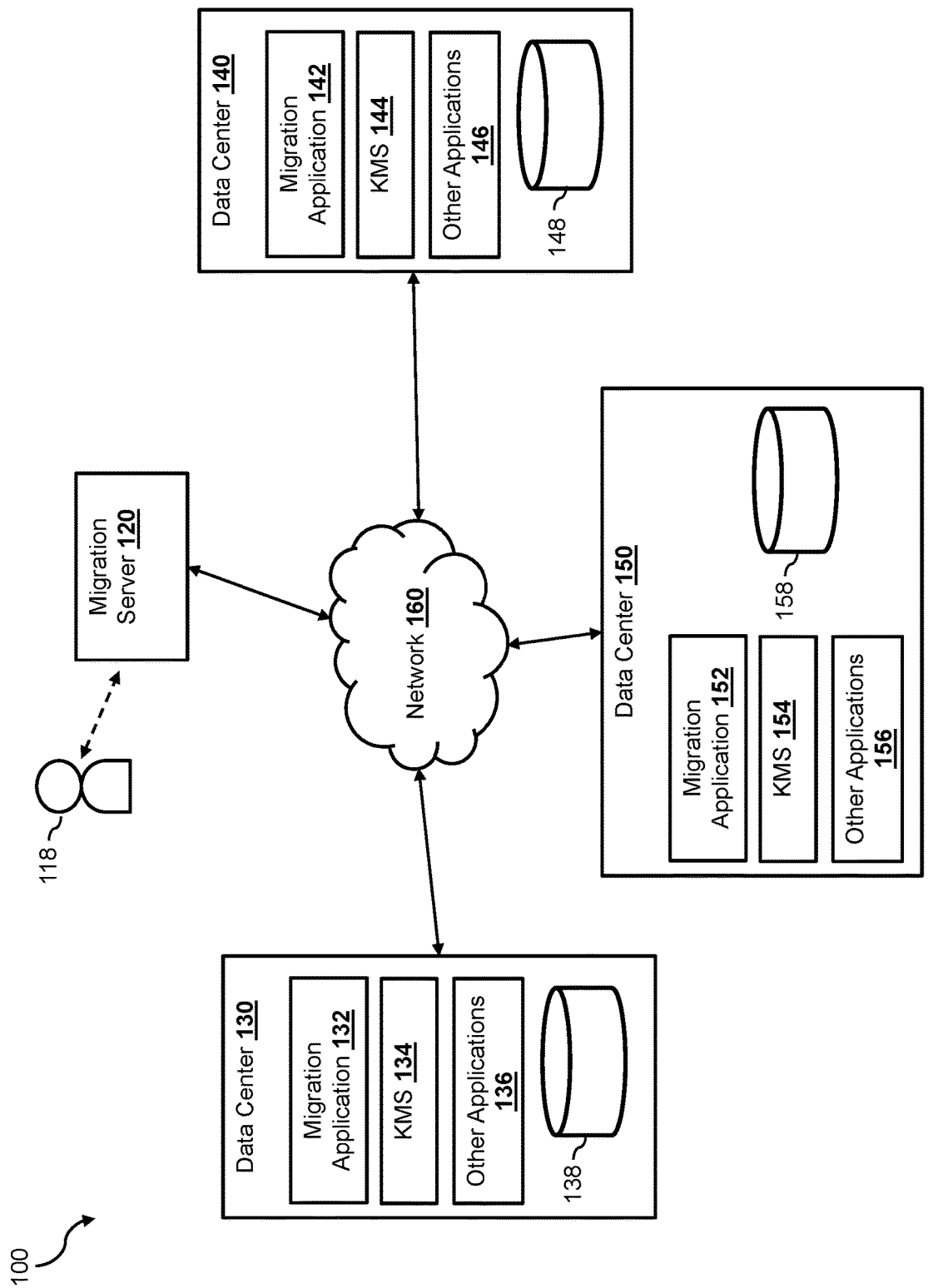
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for facilitating migrations of electronic data across data centers in an automated and secured manner. As discussed herein, many organizations with multiple data centers for storing and managing data are facing frequent needs to move a large portion (or the entire portion) of data from one data center to another data center. A data center may include computer equipment, such as one or more computer servers, electronic data storages, computer networking devices, etc. that are disposed at a specific location (e.g., a building, a structure, etc.). As such, the data center facilitates storing, managing, and processing data associated with an organization. The data center may include the necessary computer networking devices to communicate data with computer devices external to the data center, such as computer servers and/or devices associated with the organization, user devices of users of the organizations, etc.

Data associated with the business operations of the organization may be stored in the data center. For example, if the organization provides services to various users, the data center may store user data for each user of the organization, such as personal data (e.g., names, gender, addresses, etc.), financial data (e.g., bank account numbers, credit card numbers, etc.), transaction data (e.g., a transaction history, etc.), and other types of data related to the operations of the organization. Since the data stored in the data center may include sensitive data (e.g., data that the organization does not want any third-party to access), it is important for the organization to protect the data in the data center, from for example, unauthorized access to the data by third parties. Computer networking security devices such as a firewall may be included in the data center to improve the security of data within the data center.

The data center may include applications configured to provide data services for the organization. For example, the applications may be configured to perform search and retrieval of data from the data storages based on one or more criteria. The applications may also be configured to respond to data requests by transmitting data retrieved from the data storage to one or more external devices. The applications may also be configured to receive and store data provided by one or more external devices in the data storages.

The data center may also include a key management server configured to provide cryptographic keys for encrypting/decrypting data associated with the data center. For example, the key management server may be configured to negotiate a symmetrical key with an external device for transmitting data between the data center and the external device. In another example, the key management server may generate a pair of asymmetric keys (e.g., a public key and a private key, etc.) for performing asymmetric encryption/decryption. For example, the key management server may provide the public key to an external device such that the external device may encrypt data to be sent to the data center using the public key. Upon receiving the encrypted data, an application in the data center may use the private key provided by the key management server to decrypt the data.

As the organization expands, new data centers may be included as part of the organization. For example, when the organization expands to a new geographical territory, an additional data center that is close to (or within) the new geographical territory may be required to provide services for users in the new geographical territory. In another example, the organization may acquire a new business with an existing data center storing data associated with the business. When multiple data centers are part of the organization, needs for migrating data from one data center to another data center may arise. For example, a new local law may require that all data acquired within a specific territory remains in the specific territory. Thus, the organization may be required to migrate all data that was previously collected from the specific territory to a data center located within the specific territory. In another example, after acquiring a new business, the organization may desire to move data associated with the new business to an existing data center associated with the organization. As the data may have been collected over a long period of time, the amount of data required to be migrated across data centers may be substantial. Furthermore, the data that is required to be transferred may include sensitive data. While the data may be secured within the data center based on the security devices and/or applications associated with the data center, the migration of the data to another data center through a publicly accessible network can introduce data security challenges.

Conventional solutions often require multiple manual steps to coordinate the migration of data between two data centers, which can lead to errors and breach of security when any one of the steps is not performed properly. As such, according to various embodiments of the disclosure, a migration system may facilitate migrations of data between data centers in an automated and secured manner. In some embodiments, the migration system may include a migration server that is external to the data centers and communicatively coupled to the data centers. The migration system may also include a migration client application within each of the data centers (e.g., executed on a computer device within the data center). In some embodiments, the computer device on which the migration client application executes is configured to designate a computer hardware memory (e.g., a random access memory) as an attested enclave. The attested enclave is physically isolated from other hardware memory associated with the computer device such that only applications running within the attested enclave may access data within the attested enclave.

In some embodiments, the migration system may configure the migration client application to be executed within the attested enclave of the computer device in each of the data centers, such that data being processed by the migration client application may be isolated and physically secured from other applications of the data center.

In some embodiments, the migration server may include a data storage configured to store data associated with each of the data centers of the organization. The data may include identities of the data centers, geographical locations of the data centers, types of data that are stored in each of the data center, and network addresses associated with the key management servers within the data centers. The migration server may also store data associated with different data policies associated with different geographical territories. For example, a policy may specify that data collected within a particular geographical territory is required to remain within the particular geographical territory (e.g., cannot be exported outside of the particular geographical territory). Another policy may specify that data from outside a particular geographical territory should not be stored within the particular geographical territory due to high security breaches within the particular geographical territory. In some embodiments, a policy for a data center may specify one or more storage requirements for storing the data, such as a specific format of the data, an expiration time when the data is removed (e.g., deleted) from the data center, and other storage requirements.

In some embodiments, the migration server may automatically initiate one or more data migration processes among the data centers based on the policies and/or detectable events. For example, the migration server may monitor certain attributes associated with each of the data centers, which may include a data capacity, a network interruption, a power outage frequency, and news associated with the geographical location (e.g., natural disasters, political statuses, etc.). When a triggering event associated with a first data center is detected (e.g., a power outage frequency exceeding a threshold, a natural disaster such as an earthquake or a tsunami, a political uprising, etc.), the migration server may initiate a data migration process for migrating data from the first data center to another data center (e.g., a second data center).

In some embodiments, the migration server may provide a user interface that enables a user to initiate a data migration process. For example, the user interface may enable a user to provide inputs such as a source data center, a destination data center, criteria associated with data to be migrated from the source data center to the destination data center, etc. When the migration server receives a request from the user via the user interface, the migration server may initiate a data migration process for migrating data that satisfies the criteria from the source data center to the destination data center.

In some embodiments, before initiating the data migration process, the migration server may determine whether the data migration process (initiated automatically by the migration server or initiated by a user via the user interface) complies with all of the policies associated with the source data center and the destination data center. For example, the migration server may determine whether there is any policy against exporting data out of a geographical territory associated with the source data center or against importing data into a geographical territory associated with the destination data center. The migration server may also determine whether the type of data (as specified by the criteria) can be migrated from the source data center to the destination data center. If it is determined that the data migration process is not in compliance with any policy stored in the migration server, the migration server may abort the data migration process, and may transmit a notification to a device associated with the organization. On the other hand, if it is determined that the data migration process is in compliance with all of the policies stored in the migration server, the migration system may begin the data migration process. In some embodiments, the migration system and/or migration server i) periodically checks whether there are updates to policies, regulations, or laws, ii) is updated with any changes to existing policies, regulations, laws, iii) is updated with any new policies, regulations, or laws, and/or iv) initiates a check for updates upon a request to migrate data. Such updates are then stored on the migration server or on storage accessible by the migration server.

To begin the data migration process, the migration server may first retrieve respective public keys associated with the source data center and the destination data center. In some embodiments, the migration server may transmit a key request to the key management servers associated with the source data center and the destination data center. The migration server may receive a public key associated with the source data center from the key management server associated with the source data center. The migration server may also receive a public key associated with the destination data center from the key management server associated with the destination data center. In some embodiments, the migration server may determine whether to authenticate the source data center and/or the destination data center before transmitting the respective public keys to the source data center and the destination data center. For example, after receiving the public keys from the key management servers, the migration server may transmit a token request to the source data center and the destination data center. The source data center may generate a token by encrypting a piece of data using a private key associated with the source data center, and may transmit the token to the migration server as a response to the token request. Similarly, the destination data center may generate a token by encrypting a piece of data using a private key associated with the destination data center, and may transmit the token to the migration server as a response to the token request. The migration server may authenticate the source data center and the destination data center based on the tokens using the respective public keys. The migration server may then transmit the public key associated with the destination data center to the migration client application associated with the source data center, and transmit the public key associated with the source data center to the migration client application associated with the destination data center.

The migration server may then instruct the respective migration client applications associated with the source data center and the destination data center to perform steps related to the data migration process for migrating data from the source data center to the destination data center. In some embodiments, the migration client application associated with the source data center may receive an identity of the destination center and criteria for the data to be migrated to the destination. The migration client application may retrieve the data that satisfies the criteria from the one or more data storages associated with the source data center. In some embodiments, the migration client application may generate queries (e.g., SQL queries, etc.) based on the criteria to retrieve the data. The migration client application may then temporarily store the retrieved data within the attested enclave of a computer device associated with the source data center. As discussed herein, the attested enclave includes a hardware memory portion of the computer device that is physically isolated or secured, such that any applications that are not being executed within the attested enclave cannot access any data within the attested enclave. Since the migration server has caused the migration client application to be executed within the attested enclave, the migration client application may have full access to the hardware memory portion. In one example, the migration server may configure the migration client application with an indicator such that when the computer device executes the migration client application, the computer device is configured to execute the migration client application within the attested enclave.

The migration client application associated with the source data center may process the retrieved data within the attested enclave. The processing of the retrieved data may include encrypting the data using the public key associated with the destination data center. In some embodiments, the processing may also include generating a digital signature using a private key associated with the source data center. Processing the data within the attested enclave ensures that no other external applications or devices have access to the data before the data is encrypted and ready for migrating to the destination data center. Furthermore, encrypting the data using the public key of the destination data center ensures that the data being transferred would not be accessible by any other data centers.

After processing the data, the migration client application associated with the source data center may transmit the processed data to a pipeline, from which the migration client application associated with the destination data center may retrieve. The pipeline may be implemented in different forms according to different embodiments of the disclosure. For example, the pipeline may be a third-party file sharing system (e.g., Dropzone®, etc.). In another example, the pipeline may include one or more hops of data centers that are physically between the source data center and the destination data center.

The migration client application associated with the destination data center may receive instructions related to the data migration process from the migration server. The instructions may include an identity of the source data center and the type of data being migrated to the destination data center. Based on the instructions, the migration client application associated with the destination data center may be configured to monitor the pipeline for data (e.g., data files, etc.) from the source data center. The migration client application associated with the destination data center may retrieve the data from the pipeline and may transfer the data directly to the attested enclave associated with the destination data center. Since the attested enclave is physically and communicatively isolated from other processors/software applications even within the destination data center, once the data is stored in the attested enclave, no other applications within the destination data center has access to the data. This ensures that even when one or more applications of the destination data center has been hacked or taken over by malicious users, the data is safe from being accessed by such applications.

The migration client application associated with the destination data center may decrypt the data using a private key associated with the destination data center. The migration client application may then transfer the decrypted data to the data storages associated with the destination data center. By using the techniques described herein, data migrations across data centers may be performed in an automated and secured manner.

FIG. 1 illustrates a networked system 100, within which the migration system may be implemented according to one embodiment of the disclosure. Note that the present techniques may be applied in many different computing and technological environments, however, and are not limited to those shown in the figures. The networked system 100 includes a migration server 120 that implements the migration server discussed herein, and data centers 130, 140, and 150, that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

Each of the data centers 130, 140, and 150 may include computer hardware equipment for facilitating data storage, management, and processing functionalities. For example, each of the data centers 130, 140, and 150 may include one or more data storages (e.g., data storages 138, 148, and 158) for storing data associated with the data center, one or more computer servers (that includes computer processors and hardware memory such as random access memory) for performing processing, such as data storage, data retrieval, and data processing, for the data center, and network equipment configured to couple the data center to the network 160.

In addition to the hardware devices, each of the data centers 130, 140, and 150 may include applications for performing specific tasks related to the data migration processes. For example, each of the data centers 130, 140, and 150 may include a migration application (e.g., migration application 132, 142, and 152) that implements the migration client application as discussed herein. Each of the data centers 130, 140, and 150 may also include a key management system (e.g., key management systems (KMS) 134, 144, and 154) that implements the key management server as discussed herein for managing cryptographic keys for the data center. Each of the data centers 130, 140, and 150 may also include other applications (e.g., other applications 136, 146, and 156) for performing other functionalities (e.g., data management, data retrieval, data processing, etc.) for the data center.

In some embodiments, the migration server 120 may initiate a data migration process for migrating data from a source data center (e.g., the data center 130) to a destination data center (e.g., the data center 140), for example, based on a detectable event or a request by a user via a user interface provided by the migration server 120. The migration server 120 may coordinate with the migration applications associated with the source data center and the destination data center to perform the data migration process.

Figure 2:
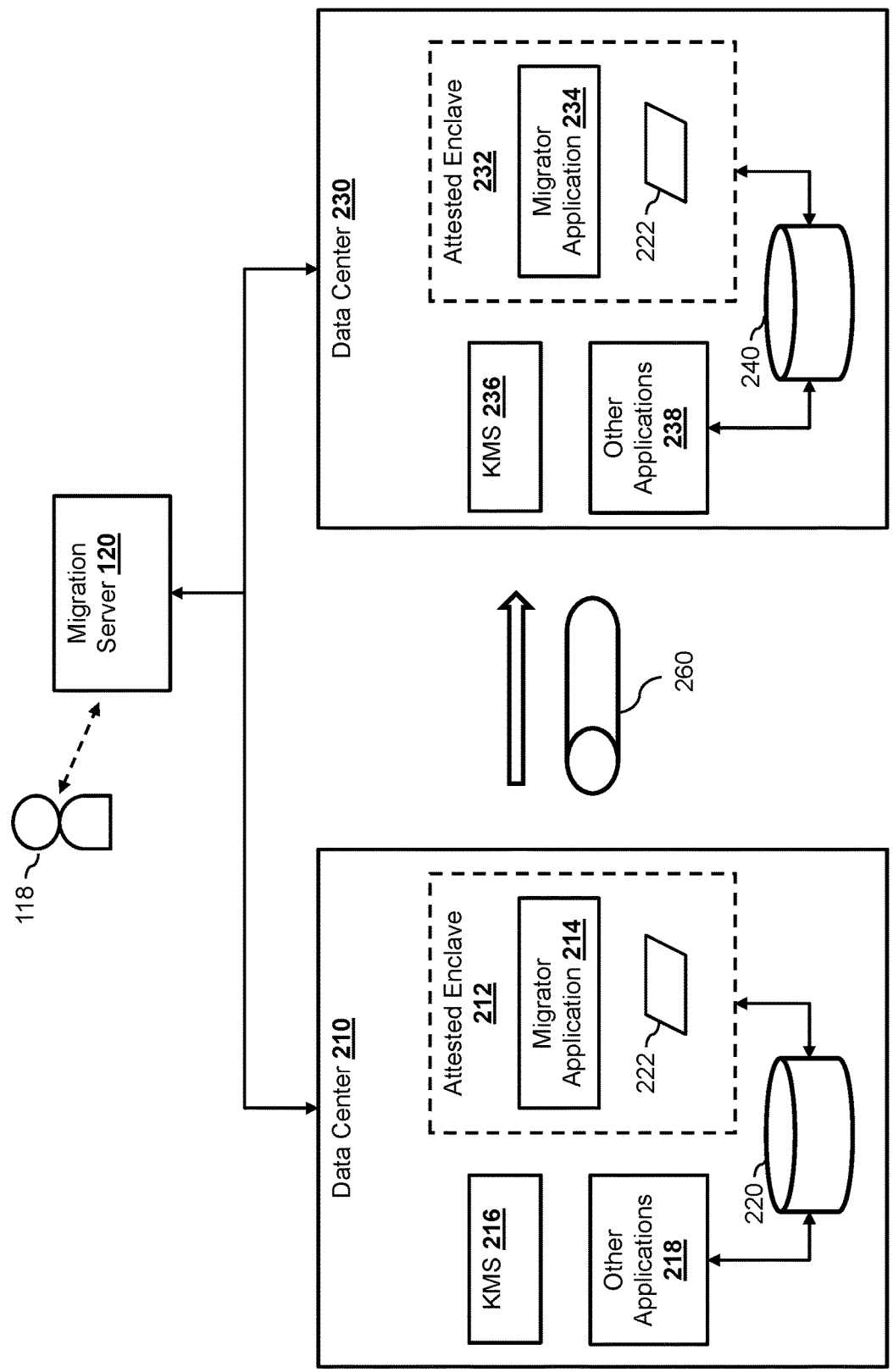
FIG. 2 illustrates an example data migration across two data centers according to an embodiment of the present disclosure.

FIG. 2 illustrates a block diagram of two data centers 210 and 230 configured to coordinate with the migration server 120 to perform a data migration process. Each of the data centers 210 and 230 may be used to implement any of the data centers 130, 140, and 150. As shown, each of the data centers 210 and 230 includes an attested enclave, a key management system, other applications, and a data storage. For example, the data center 210 includes an attested enclave 212, a key management system 216, other applications 218, and a data storage 220. The data center 230 includes an attested enclave 212, a key management system 216, other applications 218, and a data storage 220.

In some embodiments, the attested enclave, the key management system, the other applications, and the data storage can be implemented within the same computer hardware device or different computer hardware devices in each corresponding data center. For example, the attested enclave may be a computer hardware memory (e.g., a random access memory) within a computer device of the data center that is physically or communicatively isolated and designated as a secured memory space for particular applications. In some embodiments, a migration application (e.g., the migration application 214 and the migration application 234) may be executed within the attested enclave such that the migration application may access the memory space within the attested enclave to perform functionalities associated with the data migration process. Since the attested enclave is physically and communicatively isolated from other processors and/or software applications, only the applications (e.g., the migration application 214 and the migration application 234) executed within the attested enclave, and no other processors and/or software applications, can access data stored within the attested enclave. As such, even when one or more applications of a data center have been hacked and taken over by malicious users, the data stored within the attested enclave is still safe as it is not accessible by the other applications.

The key management systems 216 and 236 may be implemented in the same computer device as the attested enclave or in another computer device (e.g., a computer server). Each of the key management systems 216 and 236 may be configured to manage cryptographic keys for the respective data centers 210 and 230. For example, the key management system 216 may be configured to generate a private key and a public key for the data center 210, and to provide the public key to external devices (e.g., the migration server 120). In another example, the key management system 216 may be configured to negotiate a symmetrical key during a communication session between the data center 210 and an external device. Similarly, the key management system 236 may be configured to generate a private key and a public key for the data center 230, and to provide the public key to external devices (e.g., the migration server 120). In another example, the key management system 236 may be configured to negotiate a symmetrical key during a communication session between the data center 230 and an external device.

In this example, the migration server 120 may initiate a data migration process for migrating data from the data center 210 to the data center 230. Thus, the data center 210 is the source data center and the data center 230 is the destination data center. For example, the migration server 120 may receive a request from a user, via a user interface provided by the migration server 120, to migrate at least a portion of the data stored in the data center 210 (e.g., the data in the data storage 220) that satisfies a set of criteria to the data center 230. In another example, the migration server 120 may automatically trigger a data migration process based on a detected event associated with the data center 210 and/or a geographical territory within which the data center 210 is located. The criteria that specify the type of data to be migrated can be temporal-based (e.g., transaction data of transactions conducted within a particular period of time, etc.), can be location-based (e.g., user data of users who reside in a particular geographical location, etc.), or attribute-based (e.g., user data of users having a particular attribute, data having a particular security classification such as Class 1 and Class 2 data, etc.).

The migration application 214 may receive, from the migration server 120, the public key associated with the data center 230 and instructions related to the data migration process. Based on the instructions, the migration application 214 may retrieve data that satisfies the criteria from the data storage 220. For example, the migration application 214 may generate a query (e.g., a SQL query, etc.) based on the criteria and transmit the query to a data storage management system associated with the data storage 220. By executing the query, the data (e.g., data 222) that satisfies the criteria may be provided to the migration application 214. In some embodiments, the migration application 214 may temporarily store the data 222 retrieved from the data storage 220 in the attested enclave 212 before transmitting to the data center 230.

While the data 222 is temporarily stored in the attested enclave 212, the migration application 214 may perform one or more processes on the data 222. For example, the migration application 214 may generate a hashed value based on the data 222 using a hash function. The hashed value may be used subsequently by the data center 230 to validate the integrity of the data 222 being transmitted to the data center 230. The migration application 214 may then encrypt the data 222 and the hashed value using the public key associated with the data center 230. In some embodiments, the migration application 214 may also generate a digital signature using a private key associated with the data center 210. The digital signature may be used subsequently by the data center 230 to determine the authenticity of the party that transmits the data 222 to the data center 230.

The migration application 214 may then transmit the encrypted data 222, the encrypted hashed value, and the digital signature to a pipeline 260, from which the migration application 234 of the data center 230 may retrieve the data. In some embodiments, the pipeline 260 may include one or more temporary data storages that are accessible by both the data centers 210 and 230. The pipeline 260 may be implemented in different forms according to different embodiments of the disclosure. For example, the pipeline 260 may be a third-party file sharing system (e.g., Dropzone®, etc.). In another example, the pipeline 260 may include a one or more hops of data centers that are physically between the source data center 210 and the destination data center 230.

The migration application 234 of the data center 230 may receive, from the migration server 120, the public key associated with the data center 210 and instructions related to the data migration process. Based on the instructions, the migration application 234 may monitor data in the pipeline 260. In some embodiments, the migration application 234 may determine whether data has been provided on the pipeline 260 by the migration application 214. When it is determined that data has been provided on the pipeline 260 by the migration application 214, the migration application 234 may retrieve the data (e.g., the encrypted data 222, the encrypted hashed value, and the digital signature) from the pipeline 260.

In some embodiments, once the data is retrieved, the migration application 234 may immediately store the data in the attested enclave 232. While the data is stored in the attested enclave 232, the migration application 234 may perform one or more processes on the data. For example, the migration application 232 may verify the identity of the source of the data by decrypting the digital signature using the public key associated with the data center 210. Once the identity of the source of the data is verified (e.g., the data came from the data center 210), the migration application 234 may decrypt the data 222 and the hashed value using the private key associated with the data center 230. The migration application 234 may also verify the integrity of the data 222 using the hashed value. Once the integrity is verified, the migration application 234 may then store the data 222 in the data storage 240 to complete the data migration process.

Figure 3:
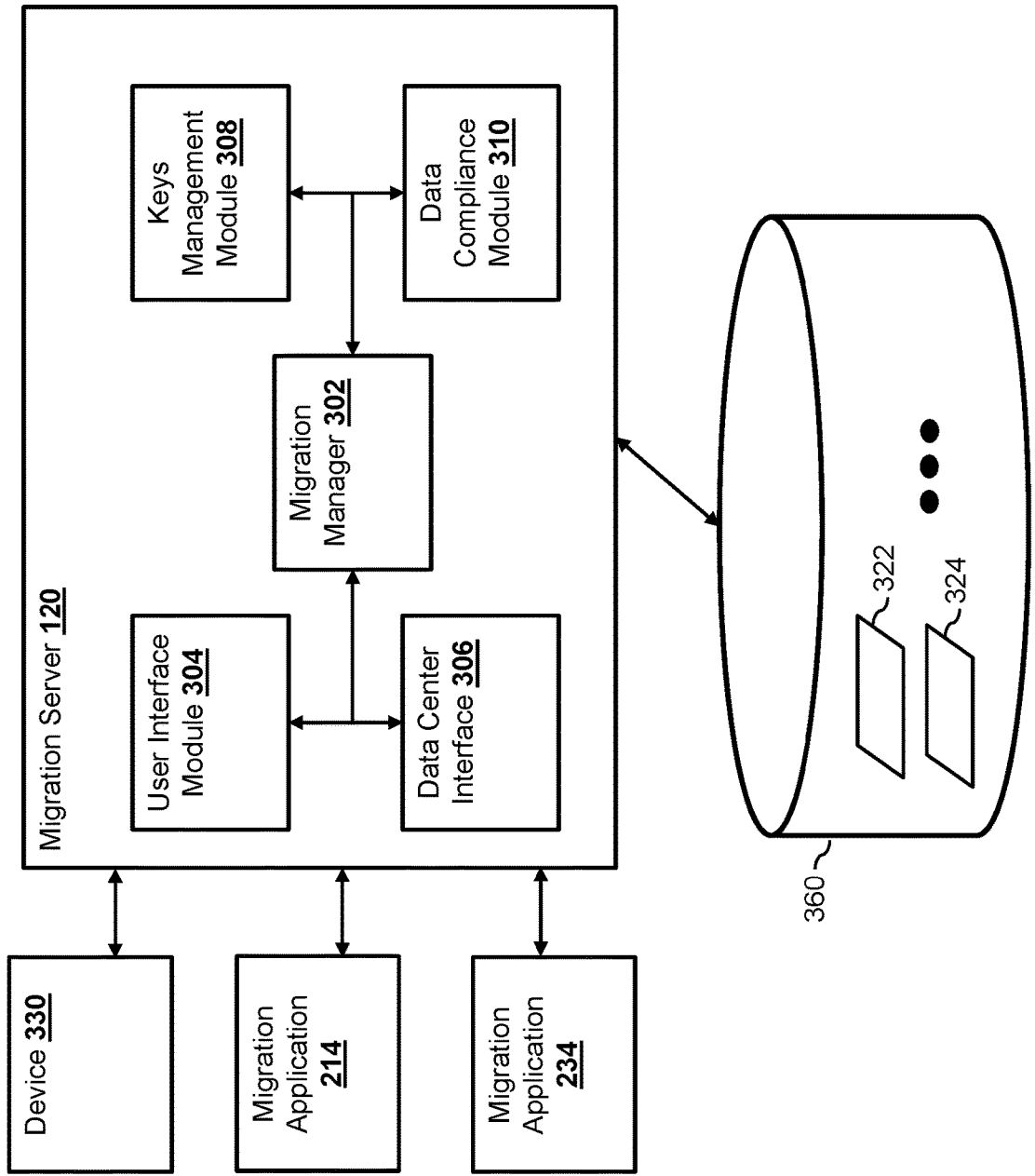
FIG. 3 is a block diagram illustrating a migration server according to an embodiment of the present disclosure.

FIG. 3 illustrates a block diagram of the migration server 120 according to some embodiments of the disclosure. The migration server 120 may include a migration manager 302, a user interface module 304, a data center interface 306, a keys management module 308, and a data compliance module 310. In some embodiments, the user interface module 304 may provide a user interface on a device 330 for configuring and initiating a data migration process. For example, the device 330 may be used by an agent of the organization associated with the data centers to initiate a data migration process between two or more data centers via the user interface provided by the user interface module 304. Via the user interface, the migration manager 302 may receive inputs specifying a source data center from which data is migrated, a destination data center to which the data is migrated, and criteria associated with the data to be migrated from the source data center to the destination data center. As discussed herein, the criteria that specify the type of data to be migrated can be temporal-based (e.g., transaction data of transactions conducted within a particular period of time, etc.), can be location-based (e.g., user data of users who reside in a particular geographical location, etc.), or attribute-based (e.g., user data of users having a particular attribute, etc.). Based on the inputs, the migration manager 302 may determine a data migration process.

In some embodiments, the migration manager 302 may be configured to monitor events associated with the different data centers of the organization. For example, the migration manager 302 may determine whether a triggering event has occurred. The triggering event may include computer power or network issues associated with a particular data center, a natural disaster (e.g., an earthquake, a flood, etc.) in an area associated with a particular data center, activities in an area (e.g., riots, political uprising, data breaches, etc.) associated with a particular data center, and other events that are determined to require a data migration. Upon detecting a triggering event, the migration manager 302 may determine parameters associated with a data migration process. For example, the migration manager 302 may determine an identity of the data center at which the event is detected, and designate that data center as the source data center. The migration manager 302 may also determine, among the data centers associated with the organization, one or more destination data centers to which the data can be migrated. In some embodiments, the migration manager 302 may determine the destination data center(s) based on a distance (e.g., selecting the data center that is physically closest to the source data center), a capacity (e.g., whether the data center has a data storage that has data storage space for the data from the source data center), and/or other criteria.

In some embodiments, the migration manager 302 may also determine criteria associated with the data to be migrated. For example, the migration manager 302 may determine that only the most recent data (e.g., the last five months) is migrated to reduce the migration time and network consumption. The migration manager 302 may then determine the data migration process based on the parameters. Before initiating the data migration process, the migration manager 302 of some embodiments may use the data compliance module 310 to determine whether the data migration process violates any existing policy. For example, the data compliance module 310 may store policies (e.g., 322, 324, etc.) in a data storage 360. The policies may be related to local laws associated with the data centers, internal policies associated with the organization, or other policies that may restrict how data can be imported and/or exported. When it is determined that the data migration process violates one or more of the policies, the migration manager 302 may abort the data migration process, and may transmit a notification to a device (e.g., the device 330). In some embodiments, the migration manager 302 may modify the data migration process (e.g., selecting a different destination data center, etc.) that may comply with all of the policies.

In some embodiments, to begin the data migration process, the migration manager 302 may use the keys management module 308 to retrieve cryptographic keys associated with the source data center and the destination data center. In this example where the data migration process is for migrating data from the data center 210 to the data center 230, the keys management module 308 may, via the data center interface 304, retrieve a public key associated with the data center 210 from the key management system 216 and retrieve a public key associated with the data center 230 from the key management system 236.

The migration manager 302 may then transmit, via the data center interface 306, the public keys and instructions related to the data migration process to the migration applications 214 and 234. For example, the migration manager 302 may transmit, via the data center interface 306, the public key associated with the data center 230 and instructions to the migration application 214. The instructions may cause the migration application 214 to retrieve data from the data storage 220, encrypt the data in the attested enclave 212, and transmit the encrypted data to the pipeline 260. The migration manager 302 may also transmit, via the data center interface 306, the public key associated with the data center 210 and instructions to the migration application 234. The instructions may cause the migration application 234 to retrieve encrypted data from the pipeline 260, store the encrypted data in the attested enclave 232, decrypt the encrypted data in the attested enclave 232, and store the decrypted data in the data storage 240.

In some embodiments, to enhance the migration efficiency (or due to the storage capacity of one or more data centers), the migration manager 302 may determine to migrate the data from the source data center to two or more destination data centers using the techniques disclosed herein. For example, the migration manager 302 may divide the data to be migrated into multiple groups where each group of data is migrated from the source data center to a different destination data center. The data migrations to the different destination data centers may be performed serially or in parallel and may occur in any order. This way, the migration process may be substantially faster. For example, when the data migration process is triggered based on an event that happens at the geographical location of the source data center (e.g., an earthquake, a political uprising, etc.), the speed of safely and securely migrating a large amount of data away from the source data center is important. By separately transmitting different portions of the data to different data centers, the data migration process may be performed substantially faster. Furthermore, when the data migration process is triggered by a temporary event (e.g., an earthquake, a power outage, etc.), the migration manager 302 may be configured to monitor events at the geographical location. When the event that affected the source data center is no longer present, the migration manager 302 may automatically initiate a second data migration process for returning the data back to the source data center using the techniques disclosed herein. Thus, the migration manager 302 may instruct the migration application of the destination data center to flag the data that has just been migrated to the destination data center such that the migration application can subsequently identify the data that was migrated from the source data center for a subsequent data migration process.

Figure 4:
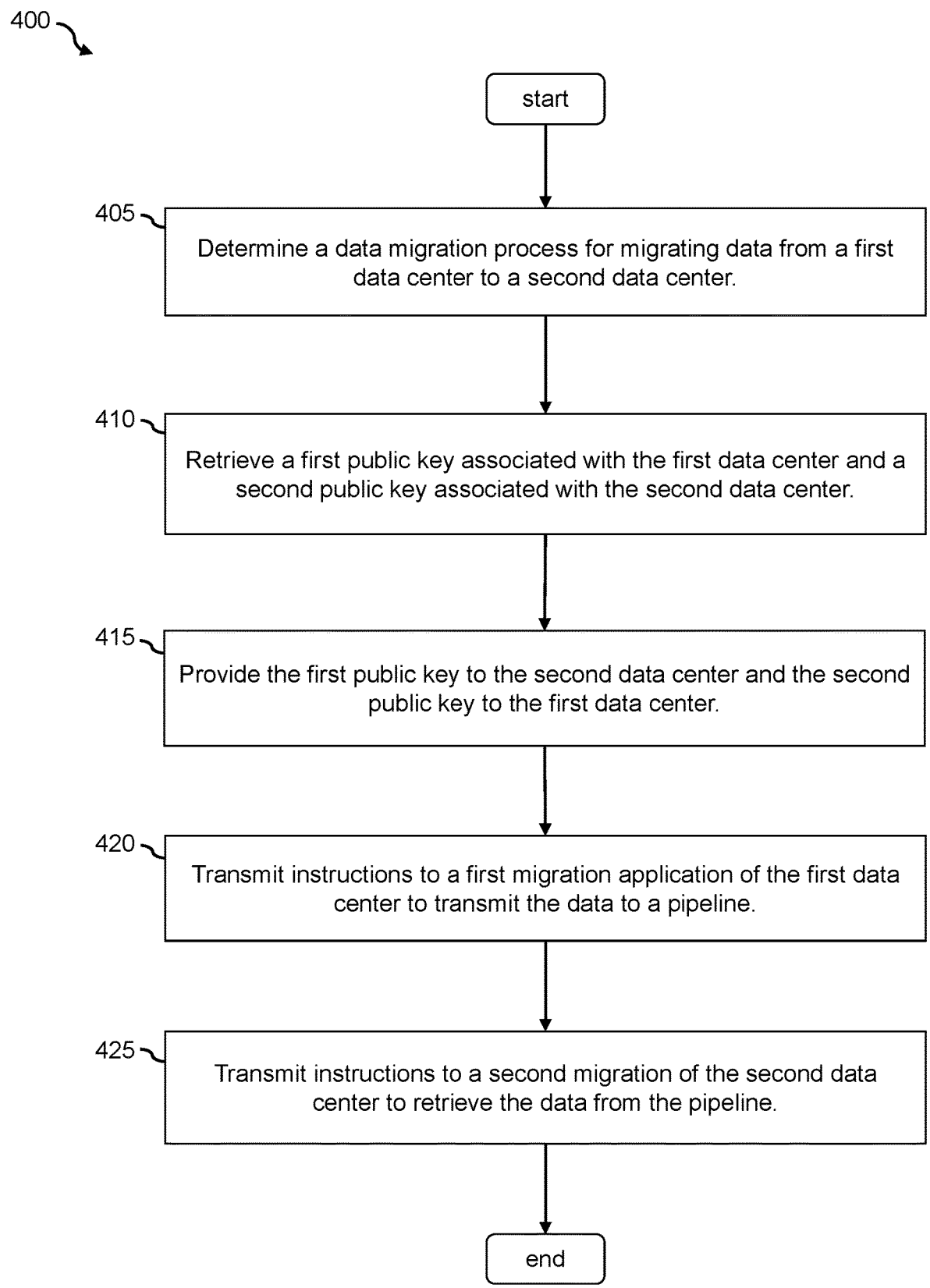
FIG. 4 is a flowchart showing a process of facilitating a data migration process according to an embodiment of the present disclosure.

FIG. 4 illustrates a process 400 for facilitating a data migration process according to various embodiments of the disclosure. In some embodiments, at least a portion of the process 400 may be performed by the migration server 120. The process 400 may begin by determining (at step 405) a data migration process for migration data from a first data center to a second data center is needed. For example, the migration manager 302 may determine a data migration process is needed based on user inputs received by an agent via a user interface provided by the user interface module 304 or a triggering event detected at one of the data centers. The data migration process may specify a source data center (e.g., the data center 210) from which data is to be migrated, a destination data center (e.g., the data center 230) to which the data is to be migrated, and criteria for the data to be migrated.

The process 400 then retrieves (at step 410) a first public key associated with the first data center and a second public key associated with the second data center and provides (at step 415) the first public key to the second data center and the second public key to the first data center. For example, the keys management module 308 may retrieve a public key associated with the data center 210 from the key management system 216, and retrieve a public key associated with the data center 230 from the key management system 236. The migration manager 302 may then provide the public key associated with the data center 230 to the migration application 214 of the data center 210. The migration manager 302 may also provide the public key associated with the data center 210 to the migration application 234 of the data center 230.

The process 400 transmits (at step 420) instructions to a first migration application of the first data center to transmit the data to a pipeline. For example, the migration manager 302 may transmit, via the data center interface 306, instructions to the migration application 214 of the data center 210. The instructions may cause the migration application 214 to retrieve data from the data storage 220 based on the criteria. The instructions may also cause the migration application 214 to temporarily store the retrieved data 222 in the attested enclave 212, encrypt the retrieved data 222 using the public key associated with the data center 230, and transmit the encrypted data to the pipeline 260.

The process 400 also transmits (at step 425) instructions to a second migration application of the second data center to retrieve the data from the pipeline. For example, the migration manager 302 may transmit, via the data center interface 306, instructions to the migration application 234 of the data center 230. The instructions may cause the migration application 234 to retrieve the encrypted data from the pipeline, and temporarily store the encrypted data in the attested enclave 232. The instructions may also cause the migration application 234 to retrieve data in the attested enclave 232, and store the decrypted data 222 in the data storage 240.

Figure 5:
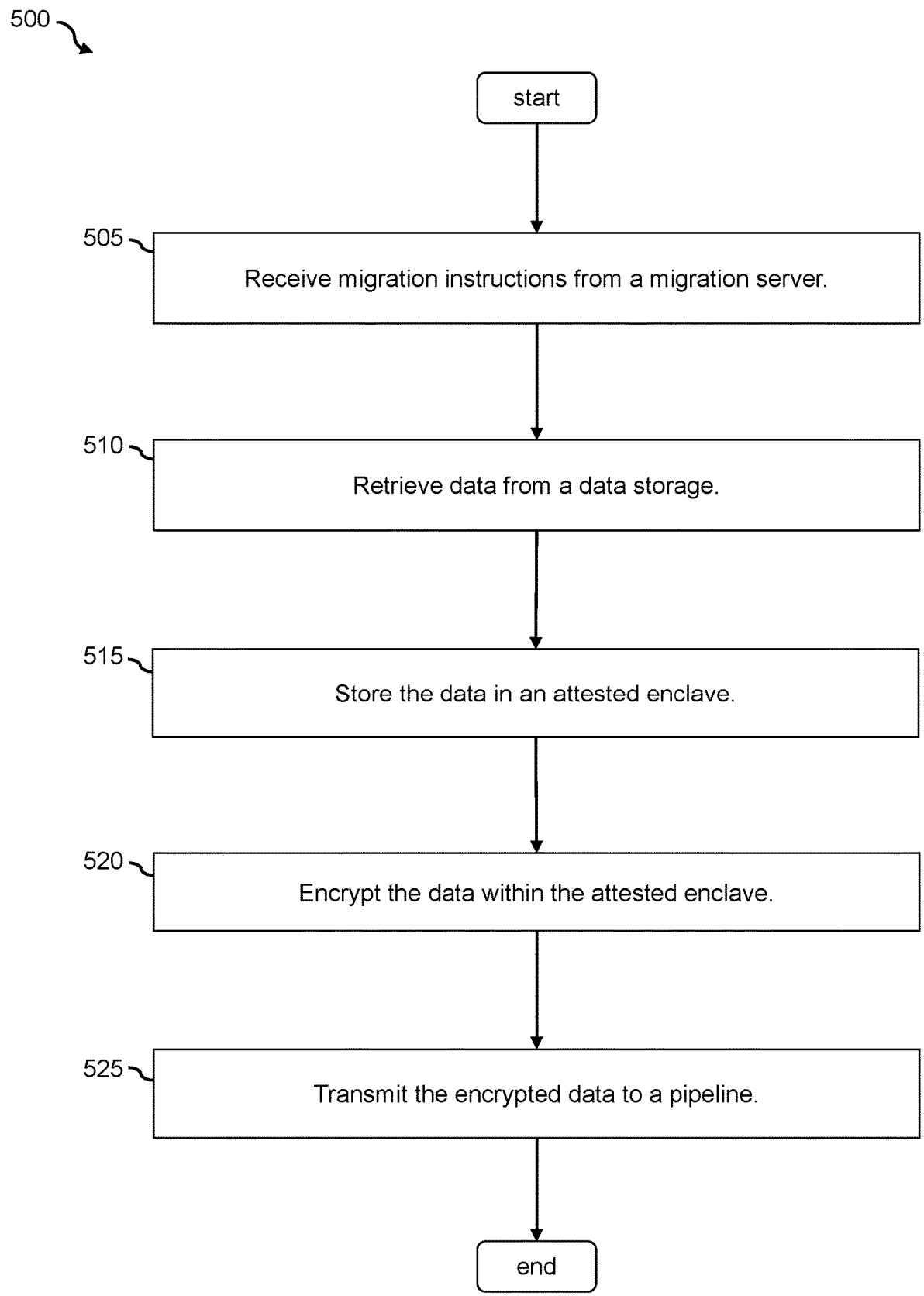
FIG. 5 is a flowchart showing a process of processing data to be migrated from a source data center according to an embodiment of the present disclosure.

FIG. 5 illustrates a process 500 for migrating data from a source data center according to various embodiments of the disclosure. In some embodiments, at least a portion of the process 500 may be performed by a migration application (e.g., the migration application 214). The process 500 may begin by receiving (at step 505) migration instructions from a migration server. For example, the migration application 214 may receive migration instructions from the migration server 120. The instructions may include a public key associated with a destination data center (e.g., the data center 230) to which the data is migrated, and criteria associated with the data to be migrated. The migration application 214 may perform the following steps based on the instructions.

The process 500 then retrieves (at step 510) data from a data storage. For example, based on the instructions received from the migration server 120, the migration application 214 may retrieve data from the data storage 220 based on the criteria. In some embodiments, the migration application 214 may generate a query based on the query and submit the query to a data storage management system associated with the data storage 220.

The process 500 stores (at step 515) the data in an attested enclave and encrypts (at step 520) the data within the attested enclave. For example, the migration application 214, upon retrieving the data 222 from the data storage 220, may temporarily store the data 222 in the attested enclave 212. The migration application 214 may encrypt the data 222 using the public key associated with the data center 230 (the destination data center) within the attested enclave 212.

The process 500 then transmits (at step 525) the encrypted data to a pipeline. For example, the migration application 214 may transmit the encrypted data 222 to the pipeline 260. In one embodiment, the migration application 214 may upload the data as one or more files to the pipeline 260, which may be an online file sharing platform.

Figure 6:
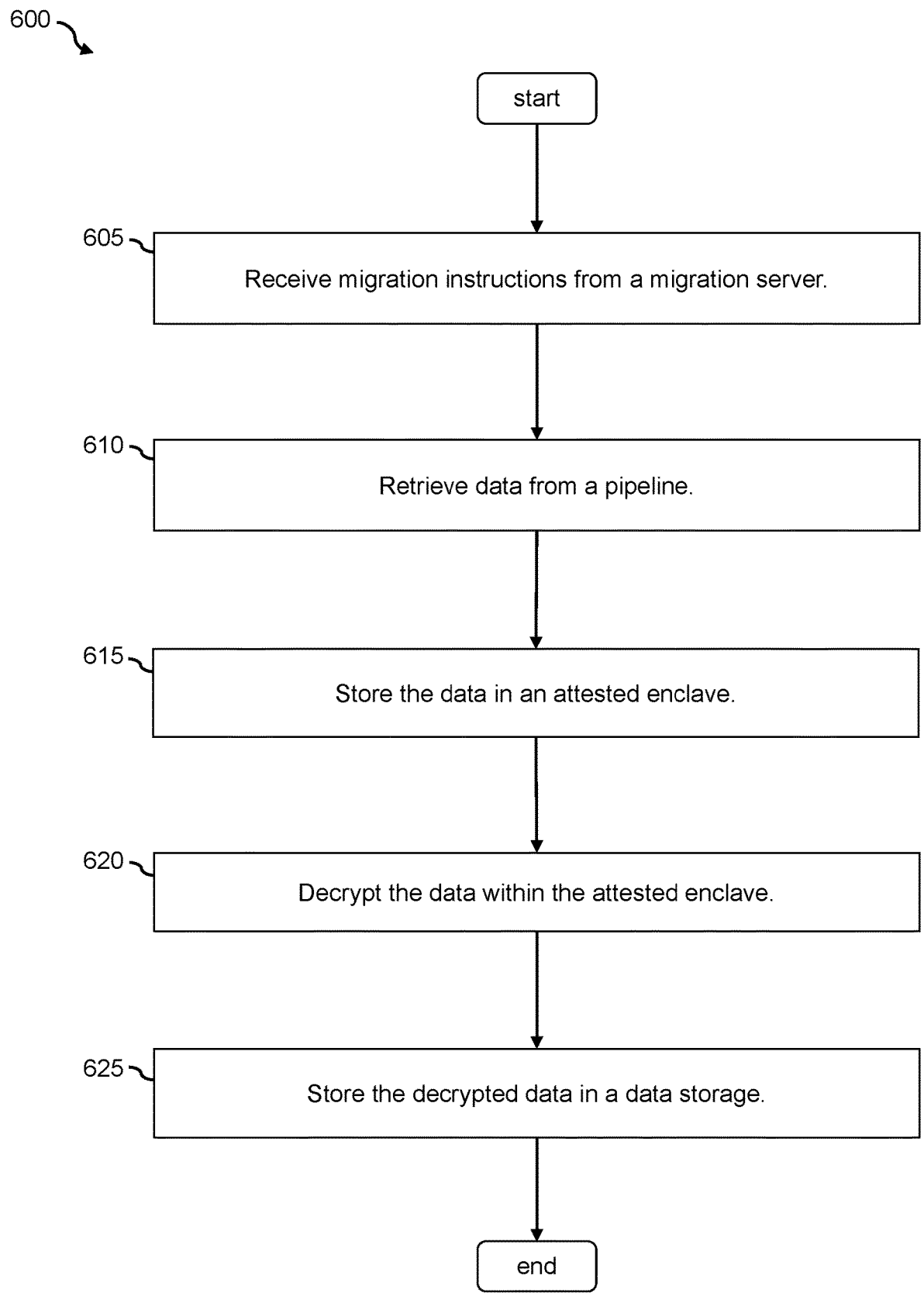
FIG. 6 is a flowchart showing a process of processing data that has been received from a source data center according to an embodiment of the present disclosure.

FIG. 6 illustrates a process 600 for migrating data from a source data center according to various embodiments of the disclosure. In some embodiments, at least a portion of the process 600 may be performed by a migration application (e.g., the migration application 234). The process 600 may begin by receiving (at step 605) migration instructions from a migration server. For example, the migration application 234 may receive migration instructions from the migration server 120. The instructions may include a public key associated with a source data center (e.g., the data center 210) from which the data is migrated. The migration application 234 may perform the following steps based on the instructions.

The process 600 then retrieves (at step 610) data from a pipeline. For example, based on the instructions received from the migration server 120, the migration application 234 may retrieve data from the pipeline 260. The process 600 stores (at step 615) the data in an attested enclave and decrypts (at step 620) the data within the attested enclave. For example, the migration application 234, upon retrieving the encrypted from the pipeline 260, may temporarily store the encrypted in the attested enclave 232. The migration application 234 may decrypt the encrypted data using the public key associated with the data center 210 (the source data center) within the attested enclave 232 to generate the data 222.

The process 600 then stores (at step 625) the decrypted data 222 in a data storage. For example, the migration application 234 may store the decrypted data 222 in the data storage 240 of the data center 230.

FIG. 7 is a block diagram of a computer system 700 for implementing a device according to an embodiment of the present disclosure that may be used to perform one or more of the functions or operations described herein. The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via a network 722, such as network 160 of FIG. 1. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the data migration functionalities described herein according to the processes 400, 500, and 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
 receiving a request for transferring data from a first data center to a second data center;
 providing a public key corresponding to the second data center to a first application of the first data center; and
 causing the first application of the first data center to:
  retrieve the data from a data storage associated with the first data center,
  store the retrieved data in a first attested enclave associated with the first data center,
  encrypt, using the public key corresponding to the second data center, the data within the first attested enclave, and
  transfer the encrypted data to a pipeline accessible by the second data center.

2. The system of claim 1, wherein the operations further comprise:
causing a second application of the second data center to:
 retrieve the encrypted data from the pipeline,
 store the encrypted data in a second attested enclave associated with the second data center, and
 decrypt the encrypted data within the second attested enclave.

3. The system of claim 2, wherein the second attested enclave is dedicated to the second application, and is isolated from other applications associated with the second data center.

4. The system of claim 1, wherein the first attested enclave is an isolated hardware memory component that limits access to data stored within the first attested enclave from applications running outside of the first attested enclave.

5. The system of claim 1, wherein the first application is executed within the first attested enclave.

6. The system of claim 1, wherein the operations further comprise:
determining that the data is permitted to transfer to the second data center at a geographical location.

7. The system of claim 1, wherein the pipeline comprises an online file sharing system.

8. A method, comprising:
receiving, by one or more hardware processors associated with a first migration application of a first data center, a data migration request from a migration server, wherein the data migration request is for transferring data from the first data center to a second data center;
retrieving, by the one or more hardware processors, the data from a first data storage of the first data center based on criteria specified in the data migration request;
storing, by the one or more hardware processors, the data in a dedicated hardware memory that is isolated from other applications of the first data center;
encrypting, by the one or more hardware processors, the data using a public key of the second data center; and
transmitting, by the one or more hardware processors, the encrypted data from the dedicated hardware memory to a pipeline for the second data center.

9. The method of claim 8, wherein the dedicated hardware memory is accessible by the one or more hardware processors, and wherein the one or more hardware processors execute programming instructions associated with the first migration application within the dedicated hardware memory.

10. The method of claim 8, wherein the first data storage is accessible by one or more applications of the first data center, and wherein the dedicated hardware memory is inaccessibly by the one or more applications.

11. The method of claim 8, further comprising:
receiving, by second one or more hardware processors associated with a second migration application of the second data center, a second data migration request from the migration server;
retrieving, by the second one or more hardware processors, the encrypted data from the pipeline;
storing, by the second one or more hardware processors, the encrypted data retrieved from the pipeline in a second dedicated hardware memory that is isolated from other applications of the second data center;
decrypting, by the second one or more hardware processors, the data using a public key of the first data center; and
storing, by the one or more hardware processors, the decrypted data in a second data storage of the second data center.

12. The method of claim 8, wherein the pipeline comprises a third data storage of a third data center.

13. The method of claim 8, further comprising:
detecting, by the migration server remote from the first data center and the second data center, a triggering event associated with the first data center; and
transmitting, by the migration server, the data migration request to the first migration application based on the detected triggering event.

14. The method of claim 13, wherein the triggering event is associated with at least one of a computer network condition or a computer power condition associated with the first data center.

15. A non-transitory machine-readable medium having stored thereon machine-readable instructions executable to cause a machine associated with a migration server to perform operations comprising:
determining parameters associated with a data migration process based on an event, wherein the parameters specify a source data center, a destination data center, and criteria associated with data to be migrated from the source data center to the destination data center;
providing a public key corresponding to the destination data center to a first application of the source data center; and
transmitting first data migration instructions to the first application of the source data center, wherein the transmitting the first data migration causes the first application to:
 retrieve the data from a first data storage associated with the first data center based on the criteria, store the retrieved data in a first attested enclave associated with the first data center, encrypt, using the public key corresponding to the second data center, the data within the first attested enclave, and transfer the encrypted data to a pipeline accessible by the destination data center.

16. The non-transitory machine-readable medium of claim 15, wherein the operations further comprise retrieving the public key corresponding to the destination data center from a key management service associated with the destination data center.

17. The non-transitory machine-readable medium of claim 15, wherein the first data storage is accessible by a third application of the source data center configured to perform transactions based on the data stored in the first data storage, and wherein the third application is blocked from accessing the first attested enclave.

18. The non-transitory machine-readable medium of claim 15, wherein the event comprises receiving input data from a user via a user interface provided by the migration server.

19. The non-transitory machine-readable medium of claim 15, wherein the event comprises a detection of a natural disaster or a power loss in a geographical region associated with the source data center.

20. The non-transitory machine-readable medium of claim 15, wherein the operations further comprise:
   transmitting second data migration instructions to a second application of the destination data center, wherein the transmitting the second data migration causes the second application to:
   retrieve the encrypted data from the pipeline,
   store the encrypted data in a second attested enclave associated with the destination data center, and
   decrypt the encrypted data within the second attested enclave.

* * * * *